(12) United States Patent
Lin et al.

(10) Patent No.: US 10,759,355 B2
(45) Date of Patent: Sep. 1, 2020

(54) VEHICLE CAMERA

(71) Applicant: DREAM 601 INVESTMENT CORPORATION, Taichung (TW)

(72) Inventors: Paul Lin, Taichung (TW); Ben Lin, Taichung (TW); Jeng-Jyh Lin, Taichung (TW)

(73) Assignee: DREAM 601 INVESTMENT CORPORATION, Taichung (TW)

( * ) Notice: Subject to any disclaimer, the term of this patent is extended or adjusted under 35 U.S.C. 154(b) by 0 days.

(21) Appl. No.: 16/739,375

(22) Filed: Jan. 10, 2020

(65) Prior Publication Data

US 2020/0148133 A1    May 14, 2020

Related U.S. Application Data

(63) Continuation-in-part of application No. 15/718,027, filed on Sep. 28, 2017, now abandoned.

(30) Foreign Application Priority Data

Oct. 5, 2016    (TW) .............................. 105132302 A (51) Int. Cl.
| | | |
|---|---|---|
| *G03B 17/00* | (2006.01) | |
| *B60R 11/04* | (2006.01) | |
| *B60S 1/54* | (2006.01) | |
| *B60S 1/56* | (2006.01) | |
| *G02B 27/00* | (2006.01) | |
| *B08B 5/02* | (2006.01) | |
| *G03B 17/02* | (2006.01) | |
| *H04N 5/225* | (2006.01) | |

(52) U.S. Cl.
CPC ................ *B60R 11/04* (2013.01); *B08B 5/02* (2013.01); *B60S 1/54* (2013.01); *B60S 1/56* (2013.01); *G02B 27/0006* (2013.01); *G03B 17/02* (2013.01); *H04N 5/2252* (2013.01)

(58) Field of Classification Search
USPC ........................................ 396/427
See application file for complete search history.

(56) References Cited

U.S. PATENT DOCUMENTS

| | | |
|---|---|---|
| 2011/0073142 A1 | 3/2011 | Hattori et al. |
| 2012/0070142 A1 | 3/2012 | Tregnago et al. |
| 2012/0117745 A1 | 5/2012 | Hattori et al. |
| 2014/0299748 A1 | 10/2014 | Koops et al. |
| 2015/0296108 A1 | 10/2015 | Hayakawa et al. |
| 2015/0353024 A1 | 12/2015 | Cooper |
| 2016/0001330 A1 | 1/2016 | Romack et al. |
| 2016/0103316 A1 | 4/2016 | Rousseau |

(Continued)

*Primary Examiner* — Rodney E Fuller
(74) *Attorney, Agent, or Firm* — Alan D. Kamrath; Mayer & Williams PC (57) ABSTRACT

A vehicle camera includes a camera and a housing. The camera has a lens unit. The housing has an accommodation space. The housing has at least one air vent at the opening. A flexible case is in front of the at least one air vent, and the flexible case includes a connection face and two covering edges. The connection face is connected with the at least one air vent, and the two covering edges are formed on two sides of the flexible case respectively. A respective one covering edge has a vertical cut line formed thereon, two vertical cut lines of the two covering edges are connected with two ends of an axial cut line respectively so as to form a linear valve, and a lowest point of the vertical cut line is spaced a spacing apart from the connection face.

4 Claims, 9 Drawing Sheets

(56) References Cited

U.S. PATENT DOCUMENTS

| | | |
|---|---|---|
| 2016/0325715 A1 | 11/2016 | Niemczyk |
| 2017/0036647 A1 | 2/2017 | Zhao et al. |
| 2017/0182981 A1 | 6/2017 | Hsiao et al. |
| 2017/0192226 A1 | 7/2017 | Eineren et al. |
| 2017/0210351 A1 | 7/2017 | Ghannam et al. |
| 2017/0225660 A1 | 8/2017 | Trebouet et al. |
| 2017/0259789 A1 | 9/2017 | McAndrew |
| 2017/0297536 A1 | 10/2017 | Giraud et al. |
| 2017/0313286 A1 | 11/2017 | Galera et al. |
| 2017/0313287 A1 | 11/2017 | Davies et al. |
| 2017/0349147 A1 | 12/2017 | Blank |
| 2018/0093644 A1 | 4/2018 | Lin et al. |

VEHICLE CAMERA

FIELD OF THE INVENTION

The present invention relates to a vehicle camera, and more particularly to a vehicle camera that is provided with an air vent to eject air flow for cleaning the water droplets and dirt on the vehicle camera.

BACKGROUND OF THE INVENTION

A vehicle camera is used as an auxiliary device when a driver backs his/her car or drives a car. Through the vehicle camera, the driver can see whether there is an obstacle between the car and other car, or through the vehicle camera to photograph the images when driving. These images can be used to protect the driver's rights or record the traffic.

However, the weather in Taiwan is humid and rainy. In rainy days, the raindrops may remain on the lens of a vehicle camera. Besides, the dust particles in the air may be mixed with water droplets. As a result, the images are blurred, which will affect the driver to determine the distance between the cars and cannot record the current road conditions. So far, the water droplets are cleaned manually. Due to the safety considerations, it is impossible to clean the water droplets when driving a car.

An improved vehicle camera is disclosed in TW Patent No. I604257 and contains a housing, wherein an inside of the housing is provided with a delivery passage for air flow to flow therethrough, thus cleaning dusts and water droplets on the lens.

However, the dusts and muds block the at least one air vent easily, thus cleaning the at least one air vent troublesomely.

SUMMARY OF THE INVENTION

The primary object of the present invention is to provide a vehicle camera. Through an air vent to eject air flow, the water droplets and dirt on the lens of the vehicle camera can be removed.

Another object of the present invention is to provide a vehicle camera, which provides a housing having an accommodation space to accommodate the camera. The shape of the accommodation space of the housing can be designed according to the actual needs. Therefore, there is no need to purchase a special-purpose camera, thereby saving the cost.

In order to achieve the aforesaid object, the vehicle camera of the present invention comprises a camera and a housing. The camera has a lens unit. The housing has an accommodation space to accommodate the camera therein. The housing has an opening for the lens unit to take a photo via the opening. The housing is provided with at least one air vent at the opening. The air vent corresponds in position to the lens unit of the camera. An inside of the housing is provided with a delivery passage for air flow to flow therethrough. One end of the delivery passage is connected to the air vent. A rear of the housing is provided with an air delivery tube and a connecting device. The air delivery tube is configured to deliver the air flow to the delivery passage. The connecting device is configured to open or close the air delivery tube. The connecting device is electrically connected with a control unit. By operating the control unit, the connecting device opens the air delivery tube to guide air flow into the delivery passage so that the air flow is blown to the lens unit through the air vent.

Through the above structure, the advantages of the present invention are described as follows:

1. When water droplets and dirt are present on the lens unit, the user can press the control unit to actuate the connecting device to deliver the air flow through the air delivery tube and the delivery passage to the air vent so that the camera has a clear view constantly.

2. The housing of the present invention has the accommodation space and the delivery passage around the periphery of the housing. Therefore, the shape of the accommodation space can be designed according to the actual needs. Therefore, there is no need to purchase a special-purpose camera, thereby saving the cost.

3. For a convenient control, the control unit is disposed on the dashboard.

4. The housing of the present invention further comprises a connecting portion on which a mounting hole is provided. The user can install the vehicle camera of the present invention on the vehicle body through a coupling bolt inserted through the mounting hole.

5. In order to enhance the cleaning effect, the housing and the camera are assembled in a recessed manner, so that the air flow ejected from the air vent can clean the water droplets and dirt on the lens unit.

Preferably, the water droplets and the dirt on the lens unit are cleaned easily. The flexible case is in front of the at least one air vent, wherein when the flexible case is closed, the dirt does not block the at least one air vent, and the insects do not enter into the air vent. In operation, the air flow pushes the flexible case away through the at least one air vent so as to clean the water droplets and the dirt effectively. After stopping blowing the air flow through the at least one air vent, the flexible case return to a close state.

A vehicle camera provided by the present invention contains a camera and a housing, the camera having a lens unit, the housing having an accommodation space to accommodate the camera therein, the housing having an opening for the lens unit to take a photo via the opening. The housing is provided with at least one air vent at the opening, the air vent corresponds in position to the lens unit of the camera, an inside of the housing is provided with a delivery passage for air flow to flow therethrough, one end of the delivery passage is connected to the air vent, a rear of the housing is provided with an air delivery tube and a connecting device, the air delivery tube is configured to deliver the air flow to the delivery passage, the connecting device is configured to open or close the air delivery tube, the connecting device is electrically connected with a control unit, by operating the control unit, the connecting device opening the air delivery tube to guide the air flow into the delivery passage so that the air flow is blown to the lens unit through the air vent. The flexible case includes a connection face and two covering edges, the connection face is connected with the at least one air vent, and the two covering edges are formed on two sides of the flexible case respectively, wherein a respective one covering edge has a vertical cut line formed thereon, two vertical cut lines of the two covering edges are connected with two ends of an axial cut line respectively so as to form a linear valve, and a lowest point of the vertical cut line is spaced a spacing apart from the connection face. Thereby, when the air flow is blown through the at least one air vent to push the linear valve away, the water droplets are blown away from the lens unit.

Accordingly, the vehicle camera of the present invention has following advantages:

1. When the linear valve is closed, the at least one air vent is closed in the flexible case so as to stop dusts, silts, muds, and insects and to avoid dirt accumulating in the at least one air vent, thus blowing the air flow through the at least one air vent stably.

2. The flexible case is made of any one of silicon polymer, rubber, and plastic, such that the flexible case returns back to the close state so as to remove the muds and the dirs. from the at least one air vent.

DETAILED DESCRIPTION OF THE PREFERRED EMBODIMENTS

Embodiments of the present invention will now be described, by way of example only, with reference to the accompanying drawings.

As shown in FIG. 1 to FIG. 4, the present invention discloses a vehicle camera 100. The vehicle camera 100 comprises a camera 10 and a housing 20. The camera 10 has a lens unit 11. The housing 20 has an accommodation space 21 to accommodate the camera 10 therein. The housing 20 has an opening 22 for the lens unit 11 to take a photo via the opening 22. The housing 20 is provided with at least one air vent 221 at the opening 22. The air vent 221 corresponds in position to the lens unit 11 of the camera 10. The inside of the housing 20 is provided with a delivery passage 23 for air flow to flow therethrough. One end of the delivery passage 23 is connected to the air vent 221. The rear of the housing 20 is provided with an air delivery tube 30 and a connecting device 40. The air delivery tube 30 is configured to deliver the air flow to the delivery passage 23. The connecting device 40 is configured to open or close the air delivery tube 30. The connecting device 40 is electrically connected with a control unit 50. By operating the control unit 50, the connecting device 40 opens the air delivery tube 30 to guide the air flow into the delivery passage 23 so that the air flow is blown to the lens unit 11 through the air vent 221.

Through the above structure, the use, advantages and effects of the present invention are described hereinafter.

Referring FIG. 1 to FIG. 4, first, the camera 10 is accommodated in the accommodation space 21 of the housing 20, and then the delivery tube 30 and the associated wires are assembled to the control unit 50 beside the dashboard 60, so that the connecting device 40 for controlling the opening or closing of the air flow can be used. It is to be noted that the housing 20 of the present invention further comprises a connecting portion 24 on which a mounting hole is provided. The user can install the vehicle camera of the present invention on the vehicle body through a coupling bolt inserted through the mounting hole.

Referring to FIG. 1 to FIG. 4, when water droplets and dirt are present on the lens unit 11, the user can press the control unit 50 to actuate the connecting device 40 to deliver the air flow through the air delivery tube 30 and the delivery passage 23 to the air vent 221 for blowing out the water droplets and dirt on the lens unit 11. There is no need for the user to wipe the lens, and the camera 10 has a clear view constantly.

Referring to FIG. 1 to FIG. 4, the housing 20 of the present invention has the accommodation space 21 and the delivery passage 23 around the periphery of the housing 20. Therefore, the shape of the accommodation space 21 can be designed according to the actual needs. Therefore, there is no need to purchase a special-purpose camera 10, thereby saving the cost.

As to the source of the air flow of the present invention, one side of a vehicle cooling fan is provided with an air storage tank. The air storage tank is provided with a multi-directional valve. One end of the multi-directional valve is used for storing air, and another end of the multi-directional valve is connected with the air delivery tube 30. Through the control unit 50, the connecting device 40 is actuated to deliver the air flow to the air vent 221 for cleaning the lens unit 11. In addition, in order to have an easy control, the connecting device 40 uses a solenoid valve to improve the practicability of the present invention by its accurate and easy-to-install characteristics.

Figure 1:
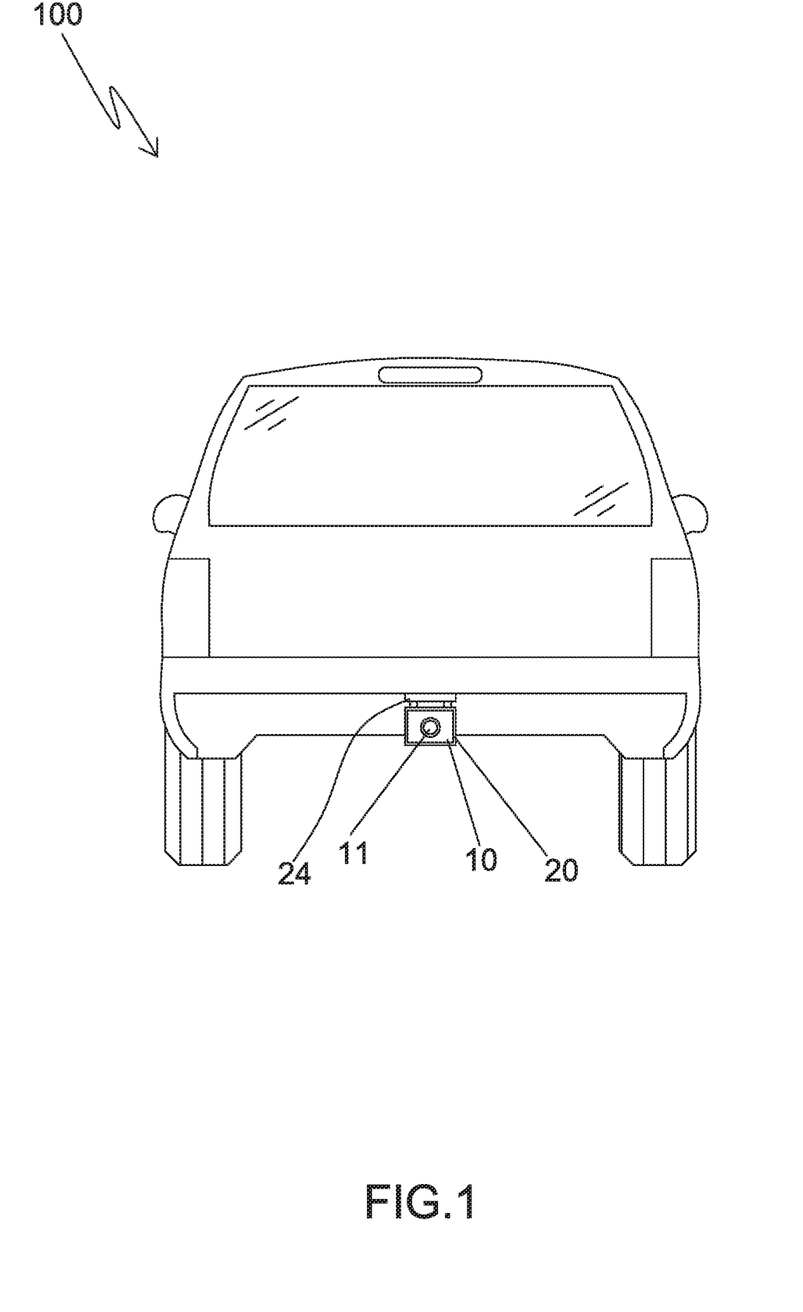
FIG. 1 is a schematic view of the present invention installed on a vehicle.
Figure 2:
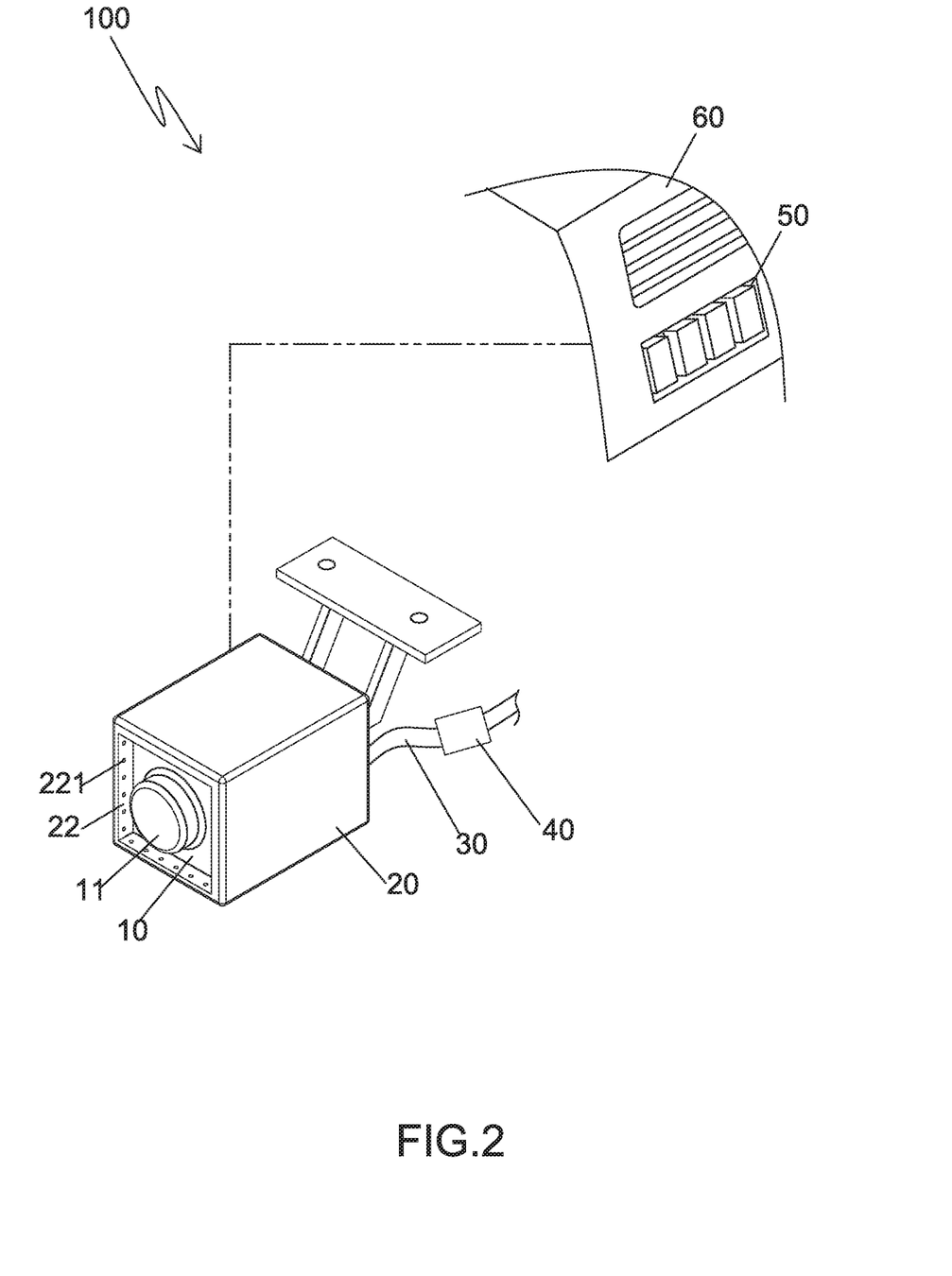
FIG. 2 is a perspective view of the present invention.
Figure 3:
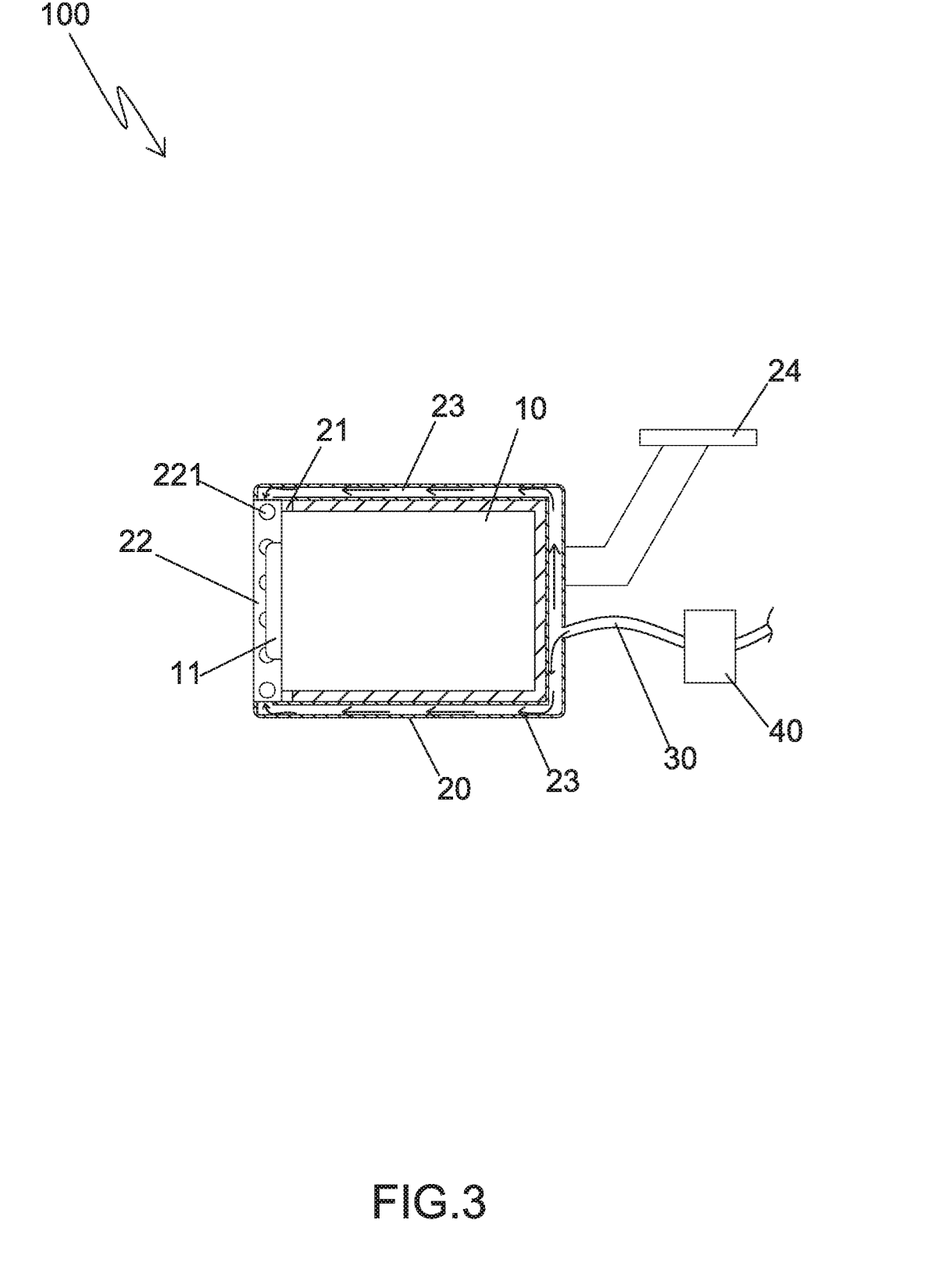
FIG. 3 is a sectional view of the present invention.
Figure 4:
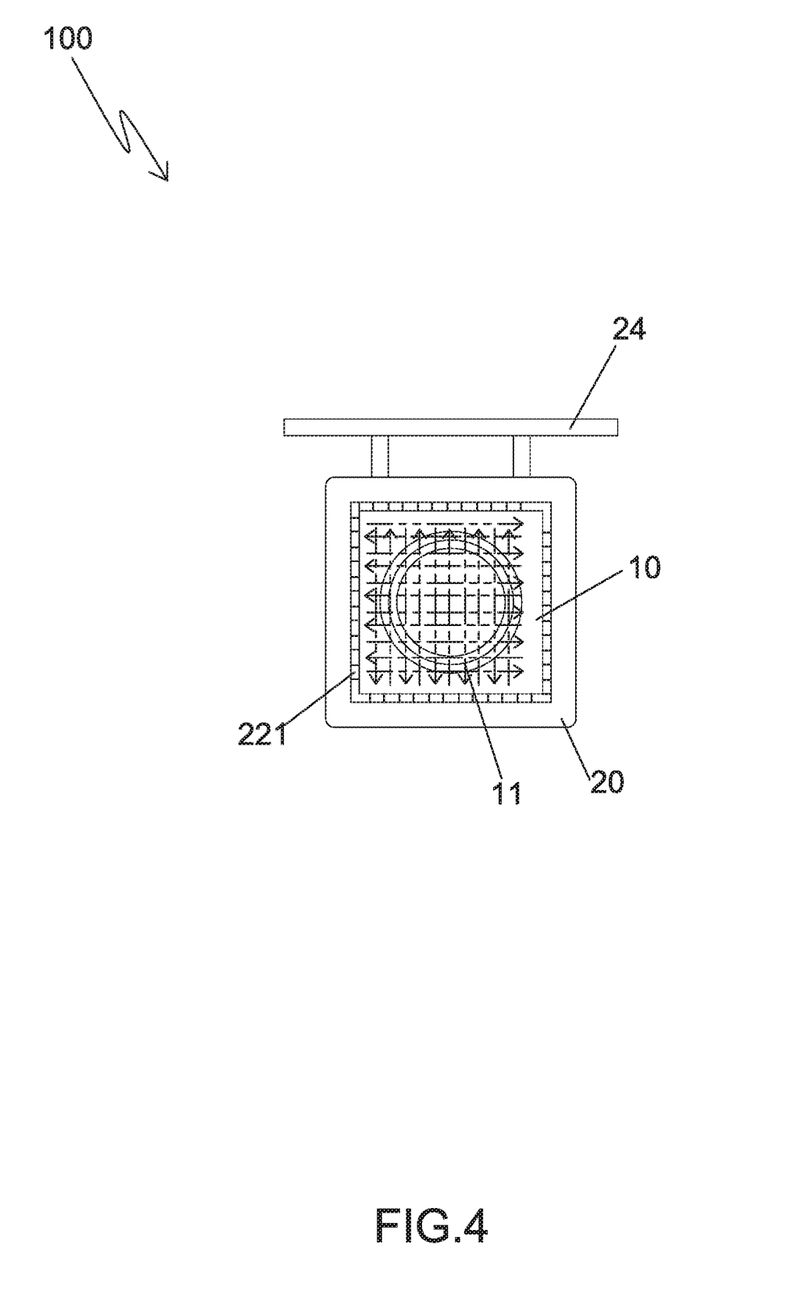
FIG. 4 is a schematic view of the present invention when in use.
Figure 5:
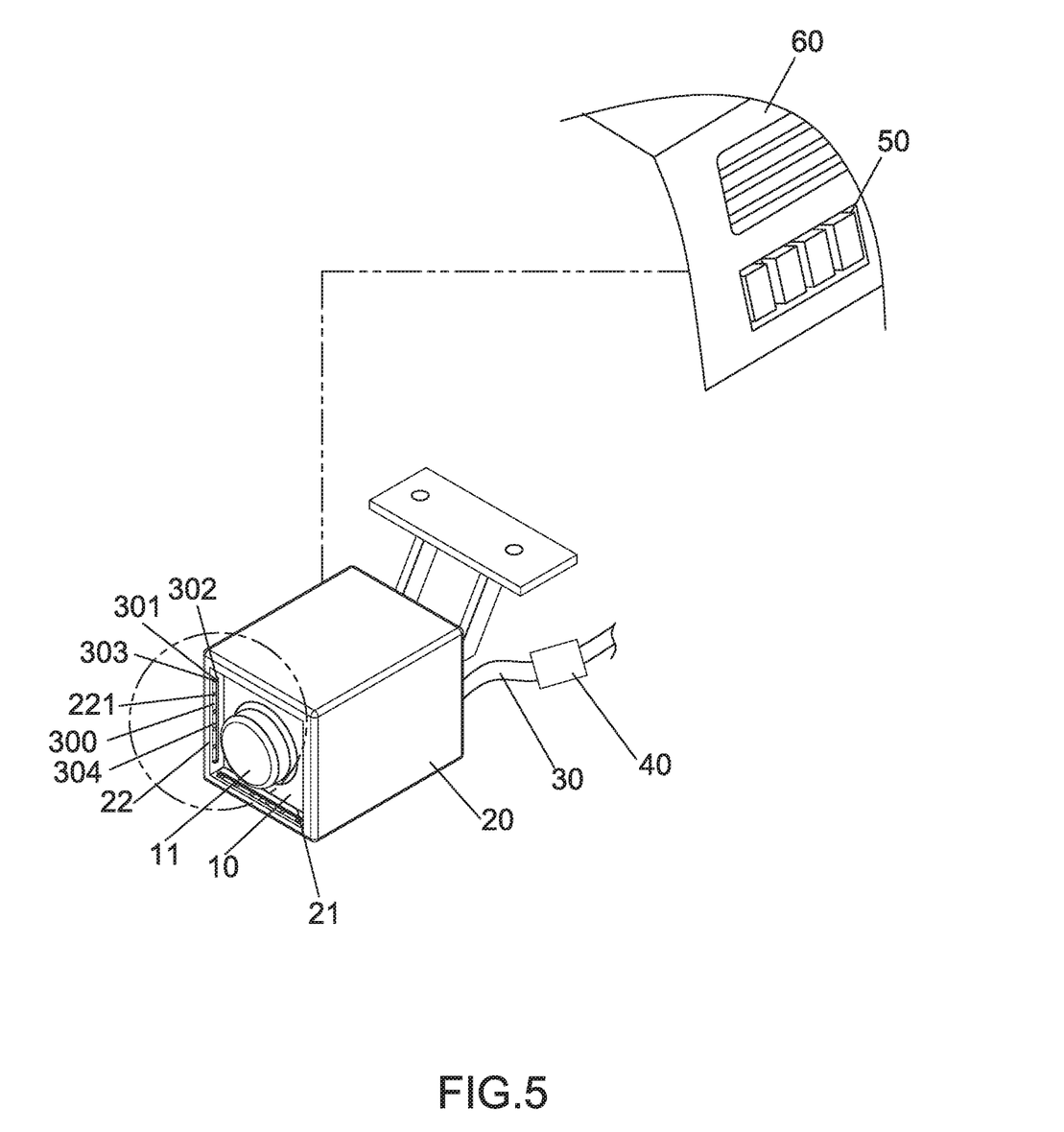
FIG. 5 is a perspective view of a flexible case of the present invention.
Figure 6:
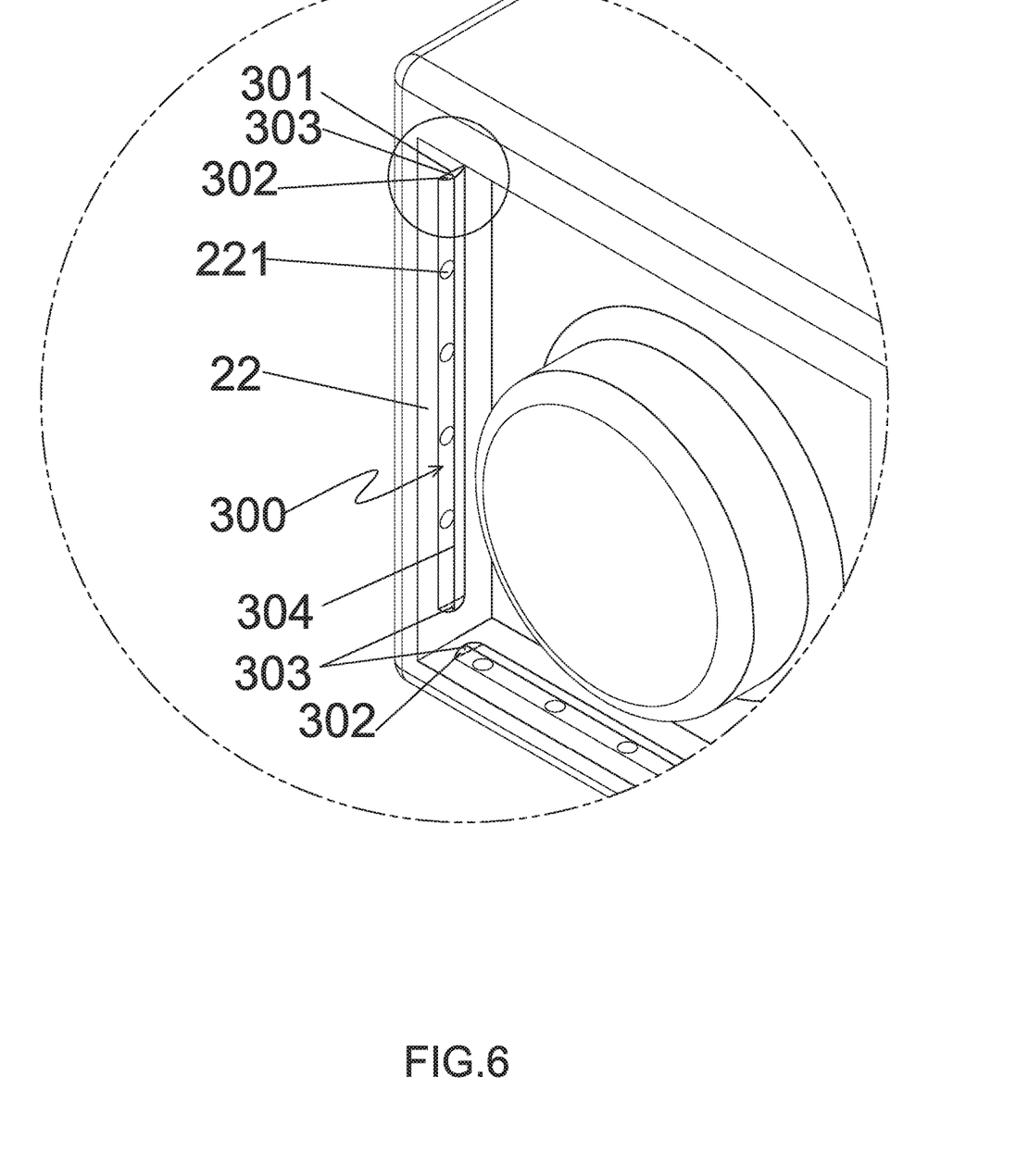
FIG. 6 is a part of the flexible case of the present invention.
Figure 7:
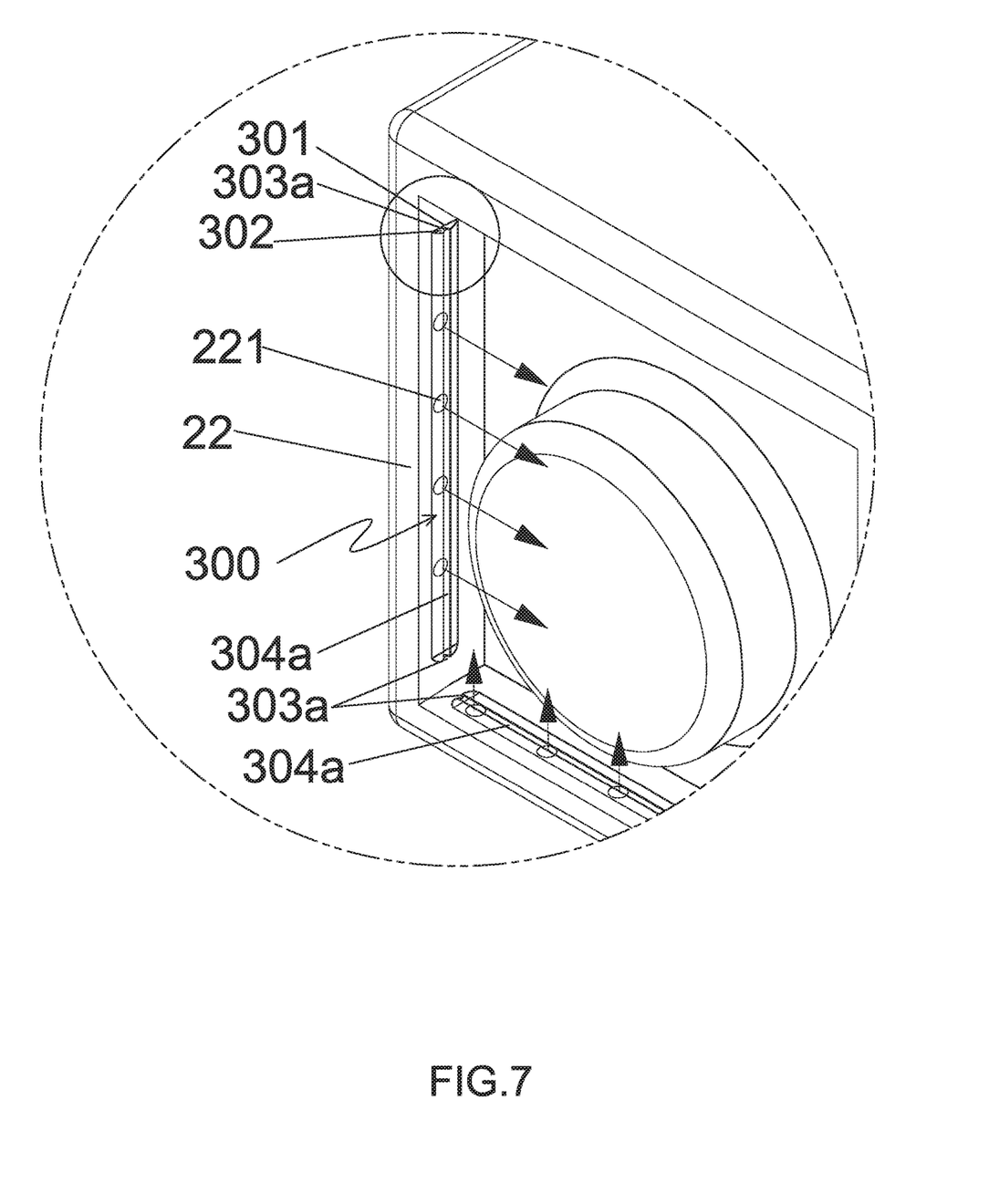
FIG. 7 is a perspective view of the operation of the flexible case of the present invention.

As shown in FIGS. 5-7, a mask structure is connected with the vehicle camera 100 and comprises a flexible case 300.

Referring to FIG. 7, the vehicle camera 100 comprises the camera 10 and the housing 20. The camera 10 has the lens unit 11. The housing 20 has the accommodation space 21 to accommodate the camera 10 therein. The housing 20 has the opening 22 for the lens unit 11 to take a photo via the opening 22. The housing 20 is provided with the at least one air vent 221 at the opening 22. The air vent 221 corresponds in position to the lens unit 11 of the camera 10. The inside of the housing 20 is provided with a delivery passage 23 for air flow to flow therethrough. One end of the delivery passage 23 is connected to the air vent 221. The rear of the housing 20 is provided with an air delivery tube 30 and a connecting device 40. The air delivery tube 30 is configured to deliver the air flow to the delivery passage 23. The connecting device 40 is configured to open or close the air delivery tube 30. The connecting device 40 is electrically connected with a control unit 50. By operating the control unit 50, the connecting device 40 opens the air delivery tube 30 to guide the air flow into the delivery passage 23 so that the air flow is blown to the lens unit 11 through the air vent 221 to clean the water droplets.

Figure 6A:
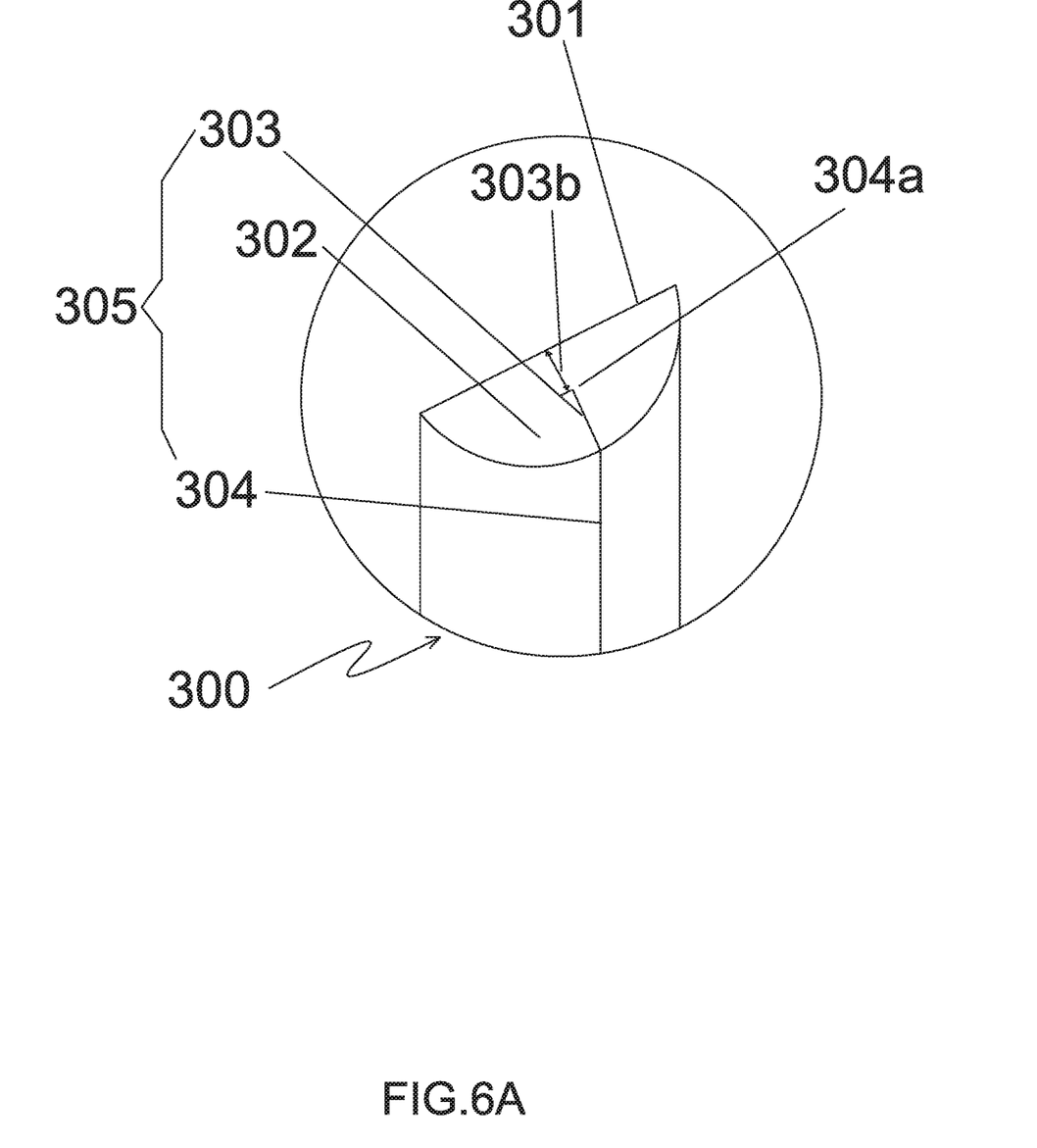
FIG. 6A is a part of the flexible case of FIG. 6.

With reference to FIGS. 5-6 and FIG. 6-A, the flexible case 300 is in front of the at least one air vent 221 and includes a connection face 301 and two covering edges 302, wherein an inside of the flexible case 300 is spaced a distance apart from the at least one air vent 221. The connection face 301 is connected with the at least one air vent 221, and the two covering edges 302 are formed on two sides of the flexible case 300 respectively, wherein a respective one covering edge 302 has a vertical cut line 303 formed thereon, a lowest point 303a of the vertical cut line 303 is spaced a spacing 303b apart from the connection face 301, and two vertical cut lines 303 of the two covering edges 302 are connected with two ends of an axial cut line 304 respectively so as to form a linear valve 305. When the air flow is not blown through the at least one air vent 221, the linear valve 305 drives the axial cut line 304 to close by ways of the vertical cut line 303, thus the linear valve 305 closes automatically. When the air flow is blown through the at least one air vent 221, it pushes the linear valve 305 away and blows the water droplets away from the lens unit 11 via a mouth 304a.

As illustrated in FIGS. 5 to 6 and FIG. 6A, when the linear valve 305 is closed, the at least one air vent 221 is closed in the flexible case 300 so as to stop dusts, silts, muds, and insects and to avoid dirt accumulating in the at least one air vent 221, thus blowing the air flow smoothly.

Figure 7A:
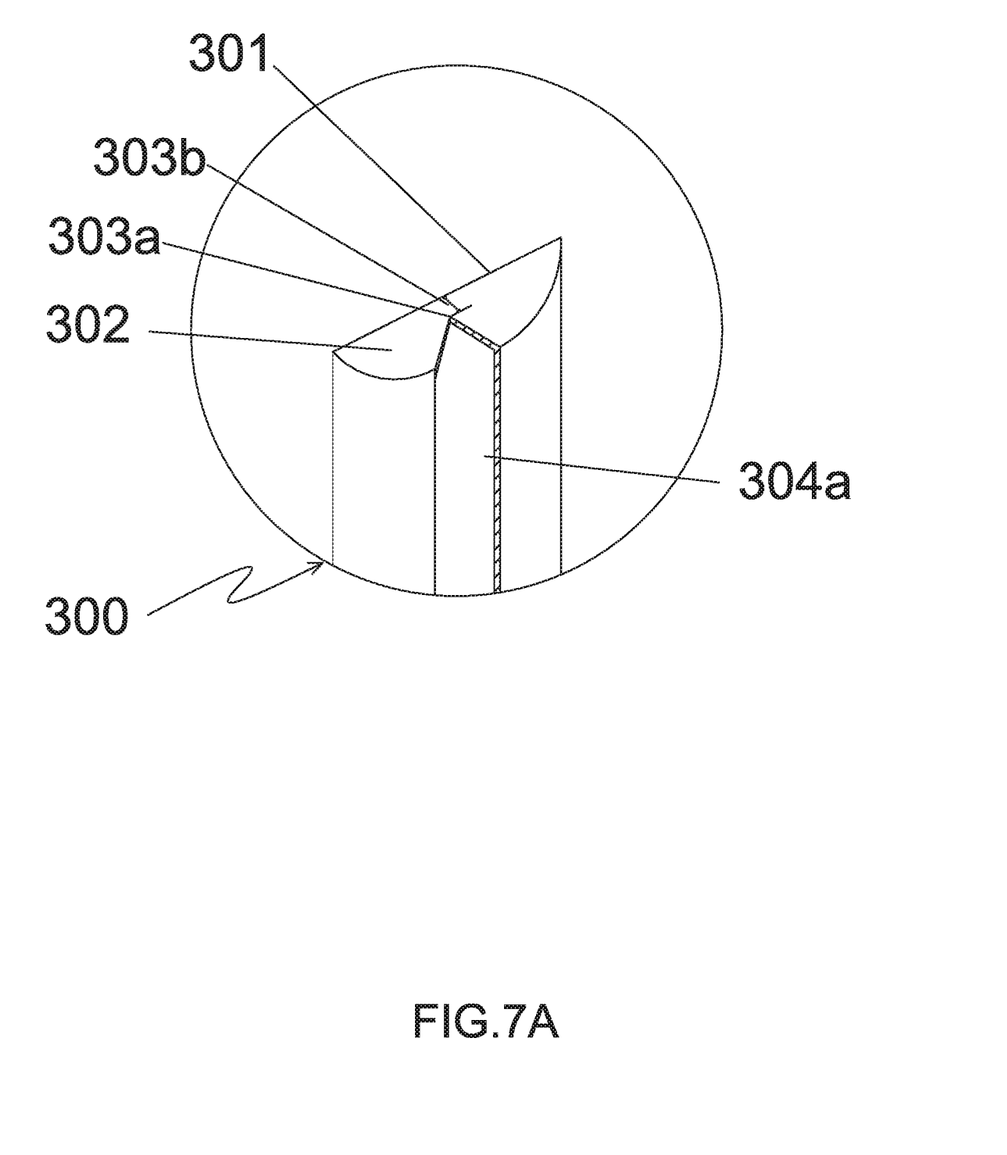
FIG. 7A is another perspective view of the operation of the flexible case of the present invention.

With reference to FIGS. 7 and 7-A, when the air flows is blown through the at least one air vent 221 to push the linear valve 305, the mouth 304a is formed so that the air flow eliminates the water droplets from the lens unit 11 via the mouth 304, thus cleaning the lens unit 11.

After stopping blowing the air flow through the at least one air vent 221, the linear valve 305 returns back to a close state by using the lowest point 303a of the vertical cut line 303 of the flexible case 300 so as to stop the dirt entering into the at least one air vent 221, as shown in FIG. 6 and FIG. 6-A.

The flexible case 300 is made of any one of silicon polymer, rubber, and plastic, such that the flexible case 300 returns back to the close state so as to stop the dirt entering into the at least one air vent 221.

Referring to FIGS. 5-7, the flexible case 300 is hollow and is formed in a semi-cylinder shape. Alternatively, the flexible case 300 is hollow and is formed in a polygonal column shape or a prism shape.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A vehicle camera, comprising a camera and a housing, the camera having a lens unit, the housing having an accommodation space to accommodate the camera therein, the housing having an opening for the lens unit to take a photo via the opening;
   wherein the housing being provided with at least one air vent at the opening, the air vent corresponding in position to the lens unit of the camera, an inside of the housing being provided with a delivery passage for air flow to flow therethrough, one end of the delivery passage being connected to the air vent, a rear of the housing being provided with an air delivery tube and a connecting device, the air delivery tube being configured to deliver the air flow to the delivery passage, the connecting device being configured to open or close the air delivery tube, the connecting device being electrically connected with a control unit, by operating the control unit, the connecting device opening the air delivery tube to guide the air flow into the delivery passage so that the air flow is blown to the lens unit through the air vent;
   a flexible case being in front of the at least one air vent, wherein the flexible case includes a connection face and two covering edges, the connection face is connected with the at least one air vent; and the two covering edges are formed on two sides of the flexible case respectively, wherein a respective one covering edge has a vertical cut line formed thereon, two vertical cut lines of the two covering edges are connected with two ends of an axial cut line respectively so as to form a linear valve, and a lowest point of the vertical cut line is spaced a spacing apart from the connection face.

2. The vehicle camera as claimed in claim 1, wherein the flexible case is made of any one of silicon polymer, rubber, and plastic.

3. The vehicle camera as claimed in claim 1, wherein the flexible case is hollow and is formed in a semi-cylinder shape.

4. The vehicle camera as claimed in claim 1, wherein the flexible case is hollow and is formed in a polygonal column shape or a prism shape.

* * * * *